United States Patent
Inoue et al.

(10) Patent No.: US 9,252,684 B2
(45) Date of Patent: Feb. 2, 2016

(54) POWER CONVERSION APPARATUS AND HIGH-VOLTAGE DC TRANSMISSION SYSTEM

(71) Applicant: HITACHI, LTD., Tokyo (JP)

(72) Inventors: Shigenori Inoue, Tokyo (JP); Shuji Katoh, Tokyo (JP); Yasuhiro Kiyofuji, Tokyo (JP); Makoto Kadowaki, Tokyo (JP); Hiroyuki Fujita, Tokyo (JP); Hideki Ogata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 188 days.

(21) Appl. No.: 14/159,530

(22) Filed: Jan. 21, 2014

(65) Prior Publication Data

US 2014/0211528 A1 Jul. 31, 2014

(30) Foreign Application Priority Data

Jan. 25, 2013 (JP) .................................. 2013-011609

(51) Int. Cl.
*H02J 3/36* (2006.01)
*H02M 7/797* (2006.01)
*H02M 7/483* (2007.01)

(52) U.S. Cl.
CPC ................. *H02M 7/797* (2013.01); *H02J 3/36* (2013.01); *H02M 2007/4835* (2013.01); *Y02E 60/60* (2013.01)

(58) Field of Classification Search
CPC ........ H01F 30/12; H01F 27/245; H02M 1/32; H02M 3/33592; H02M 5/4585; H02J 3/36; H01L 25/03
USPC ............. 363/34, 35, 51, 123, 125, 127; 336/5
See application file for complete search history.

(56) References Cited

U.S. PATENT DOCUMENTS

| | | | | |
|---|---|---|---|---|
| 3,700,925 A | * | 10/1972 | Wood | H01F 29/04 327/461 |
| 3,769,570 A | * | 10/1973 | Stairs | H02M 7/162 363/3 |
| 4,329,674 A | * | 5/1982 | Hamano | H01F 30/12 336/150 |
| 4,860,185 A | * | 8/1989 | Brewer | G06F 1/28 307/66 |
| 5,574,418 A | * | 11/1996 | Matsumura | H01F 30/12 336/155 |
| 8,923,026 B2 | * | 12/2014 | Nanut | H02M 7/17 363/129 |
| 2011/0019449 A1 | * | 1/2011 | Katoh | H02M 1/088 363/124 |
| 2012/0026767 A1 | * | 2/2012 | Inoue | H02M 7/217 363/89 |

(Continued)

FOREIGN PATENT DOCUMENTS

JP 2010-233411 A 10/2010

*Primary Examiner* — Adolf Berhane
(74) *Attorney, Agent, or Firm* — Mattingly & Malur, PC

(57) ABSTRACT

A power conversion apparatus including a three-phase transformer having at least four three-phase windings, and three converter arms each configured by connecting one or plural unit converters each including a switching device and an energy storage element in series. A power source or a load is connected to a first three-phase winding of the transformer, three series circuits which connects second and third three-phase windings of the transformer, and the converter arms in series with each other are connected in parallel, the parallel connection point is a DC terminal, and a magnitude relationship between a coupling coefficient of the first and second three-phase windings, and a coupling coefficient of the first three- and third three-phase windings is equal to a magnitude relationship between a coupling coefficient of the fourth and second three-phase windings, and a coupling coefficient of the fourth and the third three-phase windings.

20 Claims, 11 Drawing Sheets

(56) References Cited

U.S. PATENT DOCUMENTS

2014/0254226 A1* 9/2014 Nakazawa ............ H02M 7/537 363/131

2015/0236611 A1* 8/2015 Nakazawa .............. H02M 7/46 363/123

* cited by examiner

403rs 401a 402au 402aw

POWER CONVERSION APPARATUS AND HIGH-VOLTAGE DC TRANSMISSION SYSTEM

BACKGROUND OF THE INVENTION

The present invention relates to a power conversion apparatus for converting an AC electric power into a DC electric power or converting a DC electric power into an AC electric power, and a power conversion system. More particularly, the invention relates to a power conversion apparatus which includes an arm configured by connecting one or plural unit converters in series with one another, and thus is suitable for converting an electric power, and a high-voltage DC transmission system.

In recent years, a technique for converting an AC electric power into a DC electric power or converting a DC electric power into an AC electric power has been used in many cases. As far as this sort of apparatus, an apparatus which utilizes a unit converter is known. This apparatus is such that plural unit converters are connected in series with one another, and a semiconductor switching device is operated for an energy storage element in each of the unit converters, thereby carrying out an electric power converting operation. A power conversion apparatus which can withstand a high voltage is relatively, readily obtained.

As far as this power conversion apparatus, a circuit configuration is known in which plural series circuits each composed of an arm composed of a series circuit of one or plural unit converters, and a transformer winding are connected in parallel with one another. This power conversion apparatus, for example, is described in JP-A-2010-233411.

The circuit configuration described above is a type of multilevel converter. Thus, with the circuit configuration concerned, a voltage equal to or higher than a withstanding voltage of the switching device can be outputted by using an ON/OFF controllable power semiconductor device such as an Insulated-Gate Bipolar Transistor (IGBT), a Gate Turn-Off Thyristor (GTO), or a Gate-Commutated Thyristor (GCT) or the like.

It is noted that in this specification, a circuit system of the power conversion apparatus disclosed in JP-A-2010-233411 is referred to as a Zero-Sequence Cancelling Modular Multilevel Converter (ZC-MMC).

SUMMARY OF THE INVENTION

A circuit configuration in which an AC grid is connected to primary windings of a transformer, and converter arms are connected in series with secondary windings, respectively, is shown in JP-A-2010-233411 (for example, refer to FIG. 21 in JP-A-2010-233411).

The inventors of the present invention found out that in a High-Voltage Direct Current (HVDC) electric-power Transmission System, a problem that will be described below is caused depending on a relationship of a self/mutual inductance of the transformer windings in some cases.

When a grounding or short-circuiting fault is generated in the DC transmission line of the HVDC, a DC fault current is caused to flow through the transformers arms and the secondary windings of the transformers.

In general, in the transformer connected to an ultrahigh-voltage AC grid, for example, the windings connected to the ultrahigh-voltage AC grid are wound in the form of Y-connection and a neutral point of the Y-connection is grounded in many cases, However, there is caused a problem that when the DC fault is generated, the DC fault current is caused to flow as a zero-phase DC current into the primary windings of the transformer, that is, into the AC grid side as well in some cases.

The DC fault current, for example, can be cut off by a breaker connected to the primary winding (AC grid side) of the transformer. However, it is feared that the zero-phase DC current is superimposed on corresponding current, thereby exerting a bad influence on the cutoff characteristics of the breaker, and so forth.

The present invention has been made in order to solve the problems described above, and it is therefore an object of the present invention to provide a power conversion apparatus which is capable of reducing a zero-phase DC current which is caused to flow into an AC grid side even when a grounding/short-circuiting fault of a DC transmission line is generated, and a high-voltage DC transmission system.

In order to attain the object described above, according to an embodiment of the present invention, there is provided a power conversion apparatus including: a transformation device having at least three sets of four windings; and three converter arms each configured by connecting one or plural unit converters each including a switching device and an energy storage element in series with one another. In this case, the four windings are configured as a first winding, a second winding, a third winding, and a fourth winding, a circuit is configured in each of the three converter arms in such a way that either a power source or a load is connected to the first winding, and the second winding of any one of the three sets, and the third winding of any one of the three sets are connected in series with each other so that an electric power is converted between the circuit and either the power source or the load, and a magnitude relationship between a coupling efficient of the first winding and the second winding, and a coupling efficient of the first winding and the third winding is equal to a magnitude relationship between a coupling efficient of the fourth winding and the second winding, and a coupling efficient of the fourth winding and the third winding.

In addition, according to another embodiment of the present invention, there is provided a power conversion apparatus including: three single-phase transformers each having at least four single-phase windings; and three converter arms each configured by connecting one or plural unit converters each including a switching device and an energy storage element in series with one another. In this case, a circuit is configured in each of the three converter arms in such a way that either a power source or a load is connected to a first single-phase winding of each of the three single-phase transformers, a second single-phase winding of any one of the three single-phase transformers, and a third single-phase winding of any one of the three single-phase transformers are connected in series with each other so that an electric power is converted between the circuit and either the power source or the load, and a magnitude relationship between a coupling efficient of the first single-phase winding and the second single-phase winding, and a coupling efficient of the first single-phase winding and the third single-phase winding is equal to a magnitude relationship between a coupling efficient of the fourth single-phase winding and the second single-phase winding, and a coupling efficient of the fourth single-phase winding and the third single-phase winding.

As set forth hereinabove, according to the present invention, it is possible to reduce the zero-phase DC current which is caused to flow into the AC grid in the phase of the grounding or short-circuiting fault of the DC transmission line in the HVDC.

DESCRIPTION OF THE EMBODIMENTS

Figure 1:
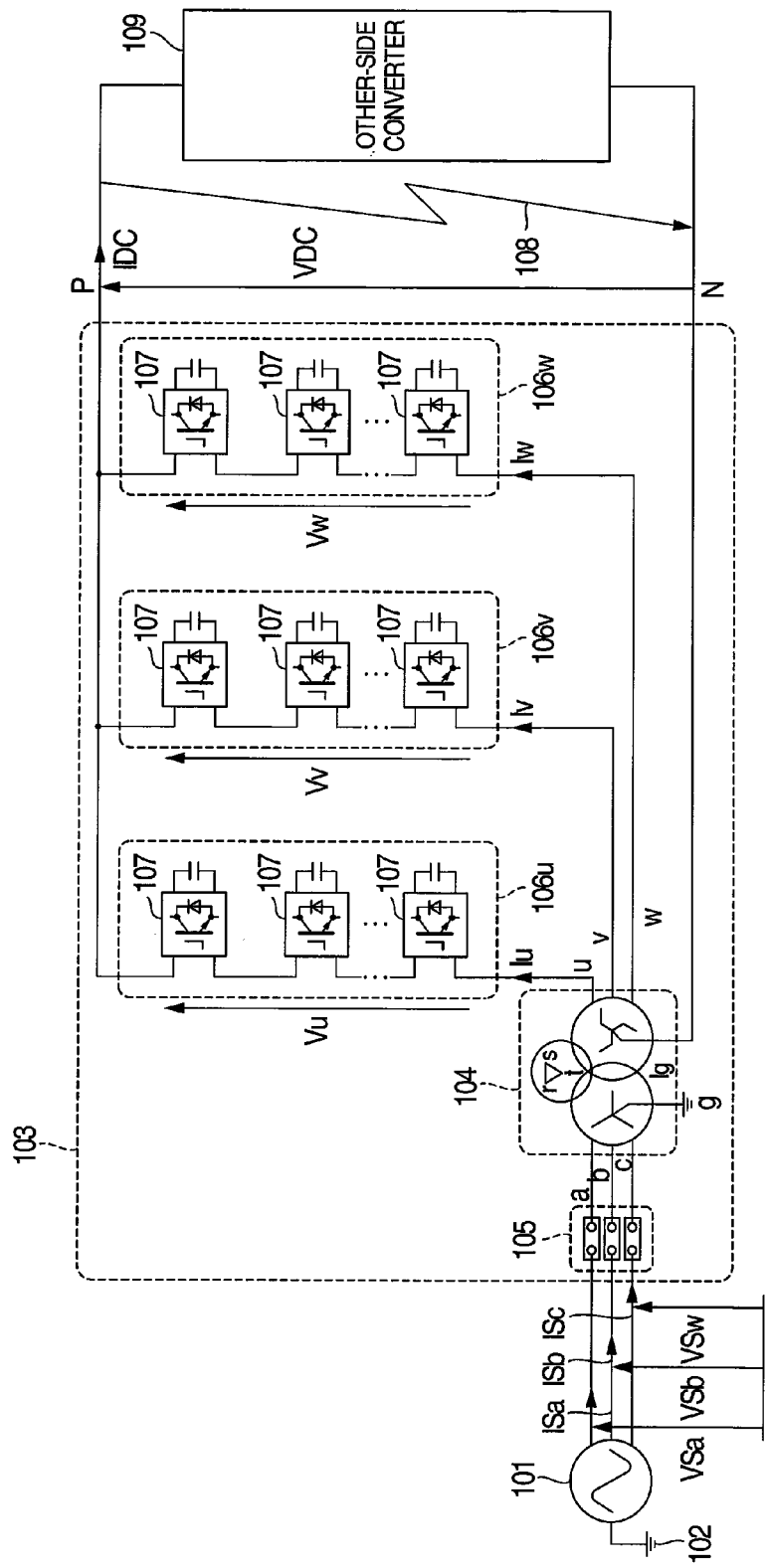
FIG. 1 is a circuit diagram showing a configuration of a power conversion apparatus according to a first embodiment of the present invention.

Prior to giving a detailed description of embodiments of the present invention, a point of the embodiments of the present invention will be described in advance. The inventors of the present invention have devised a configuration in which tertiary Δ-windings are added to the transformer described above. Not only the addition of the tertiary Δ-winding enables an electric power to be supplied from a power source to an auxiliary apparatus, but also capacitors of unit converters included in conversion arms, respectively, can be charged from the tertiary Δ-windings, and so forth. In addition, the ZC-MMC is configured by using the transformer to which the tertiary Δ-windings are added. Moreover, for example, a DC output terminal of the ZC-MMC is connected to a DC output terminal of another AC/DC conversion circuit through a DC transmission line, thereby making it possible to configure a high-voltage DC (HVDC) transmission system.

First Embodiment

Hereinafter, a power conversion apparatus according to a first embodiment of the present invention will be described. The power conversion apparatus of the first embodiment is a power conversion apparatus as will be described below. That is to say, a bidirectional chopper circuit is used as a unit converter. Three circuits in which three converter arms configured by connecting plural bidirectional chopper circuits in series with one another, and three second windings of a transformer are connected in series with one another are connected in parallel with one another. In this case, one end of a parallel connection point is used as a DC positive side terminal, and the other end of the parallel connection point is used as a DC negative side terminal. Also, the primary windings of the transformer are connected to a three-phase power system, and tertiary windings of the transformer are wound in the form of Δ-connection.

In addition, the power conversion apparatus of the first embodiment has a configuration of the HVDC in which DC terminals of the two power conversion apparatuses, or DC terminals of one power conversion apparatus and a power conversion apparatus using another system, for example, are connected to each other through a DC transmission line, of a frequency conversion apparatus (FC), or of a Back-to-Back (BTB) system.

According to the power conversion apparatus of the first embodiment, there is obtained an effect that in a phase of generation of the grounding/short-circuiting fault in the DC transmission line, the DC fault current can be prevented from being caused to flow as the zero-phase DC current into the AC grid side.

Firstly, an entire configuration of the power conversion apparatus of the first embodiment will be described with reference to FIG. 1.

A power conversion apparatus 103 is connected to an AC grid 101 through both of a transformer 104 and a breaker 105. The AC grid 101 is grounded at a grounding point 102. In addition, the AC grid 101 is connected to points a, b, and c of the primary windings of the transformer 104, and one ends of converter arms 106*u*, 106*v*, and 106*w* are connected to points u, v, and w of the secondary windings of the transformer 104, respectively. Also, tertiary windings of the transformer 104 are wound in the form of Δ-connection. It is noted that a detailed configuration of the transformer 104 will be described later with reference to FIGS. 4 to 6. In addition, the other ends of each of the converter arms 106*u*, 106*v*, and 106*w* is connected to a DC positive side terminal (point P). Moreover, a neutral point of the secondary windings of the transformer 104 is connected to a DC negative side terminal (point N).

Figure 4:
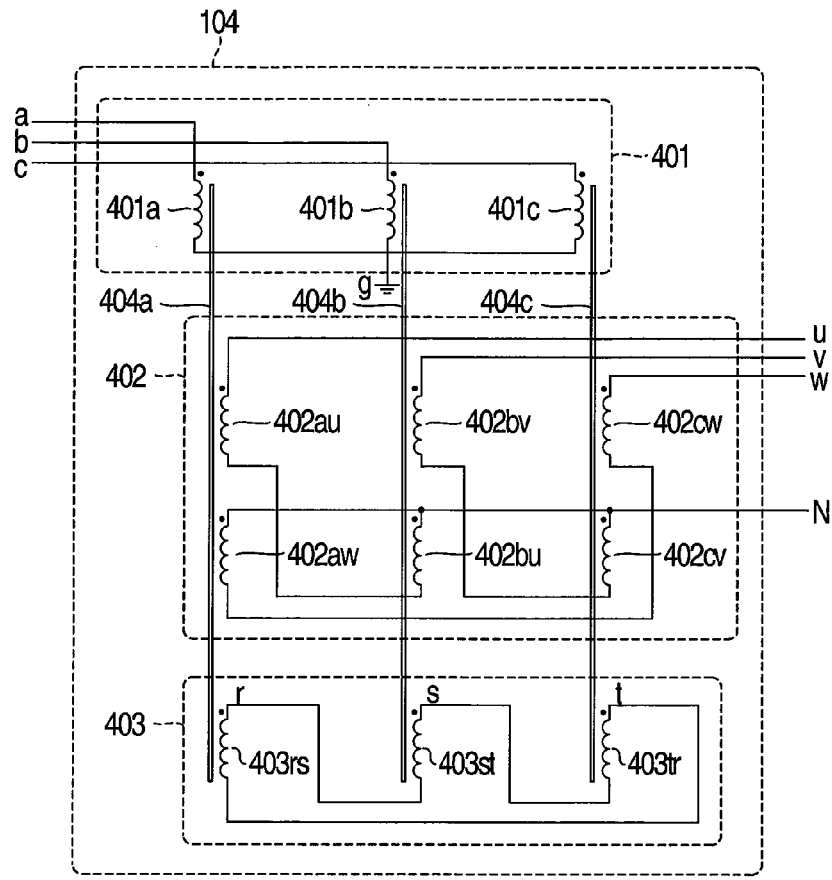
FIG. 4 is a circuit diagram showing a configuration of windings of a transformer in the first embodiment.

That is to say, the power conversion apparatus of the first embodiment adopts a configuration such that circuits in which the secondary windings 402*au*, 402*bv*, and 402*cw*, and 402*aw*, 402*bu*, and 402*cv* in FIG. 4 of the transformer 104, and the converter arms 106*u*, 106*v*, and 106*w* are connected in series with one another are connected in parallel between the point P and the point N.

An other-side converter 109 is connected either directly between the DC positive side terminal (point P) and the DC negative side terminal (point N) or indirectly between the DC positive side terminal (point P) and the DC negative side terminal (point N) through a DC transmission line (not shown). Here, the other-side power conversion apparatus 109 can have either the same configuration as that of the power conversion apparatus 103 or a configuration different from that of the power conversion apparatus 103.

Each of the converter arms 106*u*, 106*v*, and 106*w* is a series circuit of plural unit converters 107. An internal configuration of the unit converter 107 will be described later with reference to FIGS. 2 and 3.

Hereinafter, the voltages and currents which are shown in FIG. 1 will be defined as follows.

A phase voltage of an a-phase of the AC grid 101, a phase voltage of a b-phase thereof, and a phase voltage of a c-phase thereof are referred to as VSa, VSb, and VSc, respectively.

In addition, a current which is caused to flow through both of the point u of the transformer 104, and the u-phase converter arm 106u is referred to as Iu. A current which is caused to flow through both of the point v of the transformer 104, and the v-phase converter arm 106v is referred to as Iv. Also, a current which is caused to flow through both of the point w of the transformer 104, and the w-phase converter arm 106w is referred to as Iw.

Moreover, a sum of output voltages from one or plural unit converters 107 included in the u-phase converter arm 106u is referred to as an output voltage Vu. Likewise, a sum of output voltages from one or plural unit converters 107 included in the v-phase converter arm 106v is referred to as an output voltage Vv. Also, a sum of output voltages from one or plural unit converters 107 included in the w-phase converter arm 106w is referred to as an output voltage Vw.

A DC voltage developed across the DC positive side terminal (point P) and the DC negative side terminal (point N) is referred to as a VDC. In addition, a current which is caused to flow from the power conversion apparatus 103 into the other-side converter 109 is referred to as a DC current IDC.

When the power conversion apparatus 103 and the other-side converter 109 accommodate each other with an electric power, the DC current IDCs are caused to flow through the converter arms 106u, 106v, and 106w, respectively, in a division manner roughly ⅓ by ⅓, and are caused to flow as zero-phase currents through the secondary windings of the transformer 104, respectively.

In addition thereto, a capacitor voltage of each of the unit converters 107 is referred to as VCjk. Here, j represents corresponding one, of the converter arms 106u, 106v, and 106w, to which the unit converter concerned belongs. For example, j=u, v, w. In addition, k is a number within corresponding one, of the converter arms 106u, 106v, and 106w, to which the unit converter concerned belongs. For example, k=1, 2, . . . , M. Here, M is the number of unit converters 107 included in corresponding one, of the converter arms 106u, 106v, and 106w, to which the unit converter concerned belongs.

Hereinafter, an example of an internal configuration of the unit converter 107 will be described with reference to FIGS. 2 and 3. A bidirectional chopper circuit type unit converter 107c or a full-bridge circuit type unit converter 107f which can output a monopolar voltage, for example, can be used as the unit converter 107. Firstly, a circuit configuration of the bidirectional chopper circuit type unit converter 107c will now be described with reference to FIG. 2.

A circuit in which an upper side switching device 201H, and an upper side free-wheeling diode 202H are connected in anti-parallel with each other, and a circuit in which a lower side switching device 201L, and a lower side free-wheeling diode 202L are connected in anti-parallel with each other are connected in series with each other at a point a. Also, the series-connected circuit concerned is connected in parallel with a capacitor 203.

Figure 3:
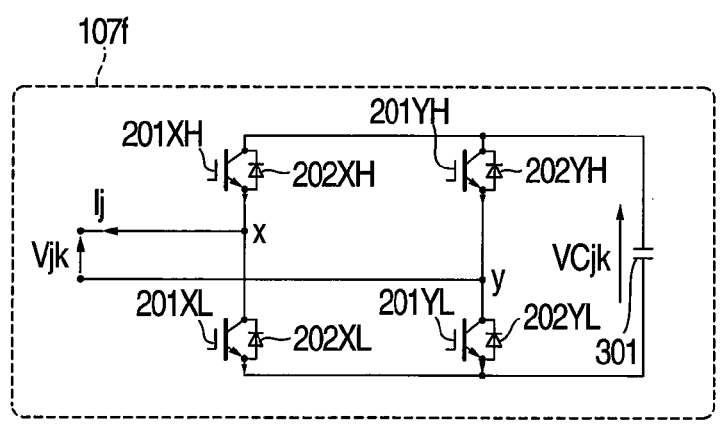
FIG. 3 is a circuit diagram showing a configuration of a full-bridge circuit type unit converter.

In this specification, the upper side switching device 201H and the lower side switching device 201L, and an X-phase upper side switching device 201XH, an X-phase lower side switching device 201XL, a Y-phase upper side switching device 201YH, and a Y-phase lower side switching device 201YL which will be all described later with reference to FIG. 3 are each generically, simply referred to as switching devices 201.

Figure 2:
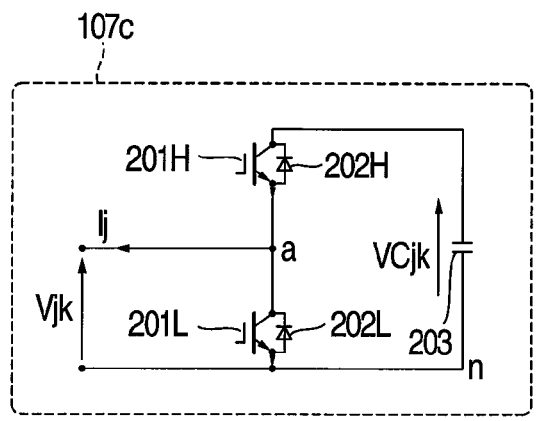
FIG. 2 is a circuit diagram showing a configuration of a bidirectional chopper circuit type unit converter.

Note that, referring to FIGS. 2 and 3, a mark of an IGBT is drawn as a mark of the switching device 201. As long as the switching device is a power semiconductor device which can be controlled so as to be turned ON or OFF, however, it is also possible to use a switching device, the kind of which is different from that of the IGBT, such as a GTO, a GCT or a Metal-Oxide-Semiconductor Field Effect Transistor (MOSFET).

A voltage developed across the point a, and one end (point n) of the capacitor 203 is referred to as an output voltage Vjk from the unit converter 107. However, j=u, v, w, and k=1, 2, . . . , M. Also, M represents the number of unit converters 107 included in each of the converter arms 104U, 104V, and 104W.

Hereinafter, a description will be given with respect to a relationship between the output voltage Vjk from the bidirectional chopper type unit converter 107c, and an ON/OFF state of the upper side switching device 201H and the lower side switching device 201L.

When the upper side switching device 201H is held in the ON state, and the lower side switching device 201L is held in the OFF state, the output voltage Vjk can be controlled so as to approximately equal the capacitor voltage VCjk irrespective of the current Ij (j=u, v, w).

On the other hand, when the upper side switching device 201H is held in the OFF state, and the lower side switching device 201L is held in the ON state, the output voltage Vjk can be controlled so as to approximately equal 0V irrespective of the current Ij.

Hereinafter, a description will be given with respect to the current when a DC fault 108 (refer to FIG. 1) which short-circuits between the DC positive side terminal (point P) and the DC negative side terminal (point N) is generated.

When the DC fault 108 occurs, the DC current IDC is increased. Therefore, the zero-phase currents which are caused to flow through the converter arms 106u, 106v, and 106w, and the secondary winding 402 of the transformer 104 are also increased.

As disclosed in JP-A-2010-239723, when all of the switching devices 201 of the unit converters 107 have been turned OFF, the currents can be prevented from being caused to flow from the capacitors 203 (or the capacitors 301) into a portion of the DC fault 108.

After all of the switching devices 201 of the unit converters 107 have been turned OFF, the converter arms 106u, 106v, and 106w are each operated as a half-wave rectifier because of the presence of the lower side free-wheeling diodes 201L of the unit converters 107C. For this reason, an AC fault current is caused to flow from the AC grid 101 into the portion of the DC fault 108. This AC fault current can be cut off by the breaker 105. Thus, after the AC fault current has been cut off, the DC side fault current is attenuated.

The inventors of the present invention found out that for a period of time for which the AC fault current is caused to flow, in addition to the AC fault current, the zero-phase currents are caused to flow into the AC grid 101 depending on the self/mutual inductances of the windings of the transformer 104 in some cases. The principles in this case, and a method of solving the same will be hereinafter described.

Firstly, an example of an internal configuration of the transformer 104 will now be described with reference to FIGS. 4 to 6.

Firstly, an example of a connection state of the windings of the transformer 104 will be described with reference to FIG. 4.

An a-phase primary winding 401a, an a-leg u-phase secondary winding 402au, an a-leg w-phase secondary winding 402aw, and an rs-phase tertiary winding 403rs are all wound around an a-phase ion core leg 404a. In addition, a b-phase primary winding 401b, a b-leg v-phase secondary winding 402bv, a b-leg u-phase secondary winding 402bu, and an st-phase tertiary winding 403st are all wound around a b-phase ion core leg 404b. Likewise, a c-phase primary winding 401c, a c-leg w-phase secondary winding 402cw, a c-leg v-phase secondary winding 402cv, and a tr-phase tertiary winding 403tr are all wound around a c-phase ion core leg 404c.

That is to say, the transformer 104 includes the four tertiary windings: the primary winding; the two secondary part-windings; and the tertiary winding.

In addition, when the iron core legs 404a, 404b, and 404c of the transformer 104 compose independent magnetic paths, respectively, and thus are composed in the form of three single-phase transformers, in other words, it can be said that the power conversion apparatus 102 includes three single-phase transformers having four single-phase windings.

The primary windings 401a, 401b, and 401c are wound in the form of star-connection, and are grounded at a point g.

In addition, the secondary part-windings 402aw, 402bu, and 402cv are wound in the form of the star-connection at a point N.

Moreover, one ends of the secondary part-windings 402au, 402bv, and 402cw are connected to the converter arms 106u, 106v, and 106w through points u, v, and w, respectively.

Ends of the secondary part-windings 402au, 402bv, and 402cw on a side opposite to the converter arms 106u, 106v, and 106w are respectively connected to ends of the secondary part-windings 402aw, 402bu, and 402cv on a side opposite to the point N.

In other words, the six secondary part-windings 402au, 402bv, and 402cw, and 402aw, 402bu, and 402cv compose zigzag connection. In the first embodiment of the present invention, the six secondary part-windings 402au, 402bv, and 402cw, and 402aw, 402bu, and 402cv are generically, simply referred to as the secondary windings. Here, the winding numbers of six secondary part-windings 402au, 402bv, and 402cw, and 402aw, 402bu, and 402cv are approximately equal to one another.

Note that, in FIG. 4, the case where the secondary part-windings 402au and 402bu, for example, are connected to each other is drawn as the connection among the six secondary part-windings 402au, 402bv, and 402cw, and 402aw, 402bu, and 402cv. However, the present invention can be applied to the case as well where the secondary windings 402 are wound in the form of the zigzag connection using a combination of the secondary part-windings different from that in FIG. 4. Thus, the first embodiment of the present invention shall contain therein such a case.

The windings 403rs, 403st, and 403tr of the tertiary windings 403 are wound in the form of Δ-connection. Although in FIG. 4, none is connected to the points r, s, and t, the first embodiment of the present invention shall contain therein the case where loads or power sources of the auxiliary apparatus or the like are connected to the points r, s, and t, respectively. When the loads are connected to the points r, s, and t, respectively, it is possible to obtain an effect that the electric powers can be supplied from the tertiary windings 403 to these loads, respectively. In addition, when the power sources are connected to the points r, s, and t, respectively, it is possible to obtain an effect that the capacitors 203 (and the capacitors 301 in FIG. 3) included in the unit converters 107 of the converter arms 106u, 106v, and 106w, respectively, can be charged with the electricity from the tertiary windings 403.

Even if the three iron core legs 404a, 404b, and 404c compose a three-leg iron core or even if the three iron core legs 404a, 404b, and 404c compose, together with other two legs (not shown), a five-leg iron core, the present invention can be applied to such a case. In addition, the present invention can be applied to the case as well where the three iron core legs 404a, 404b, and 404c compose the independent magnetic paths, respectively, and the transformer 104 is composed in the form of three single-phase transformers.

Here, in this specification, of the windings of the transformer 104, the windings connected to the AC grid 101 are referred to as the primary windings, the windings connected to the converter arms 106u, 106v, and 106w are referred to as the secondary windings, and the windings which are wound in the form of the Δ-connection are referred to as the tertiary windings. However, the terms of "primary", "secondary", and "tertiary" are convenient names for a description, and thus even when the names are different from those, present invention can be applied thereto.

A description of the windings and the iron core legs will now be described with reference to FIGS. 5 and 6.

Figure 5:
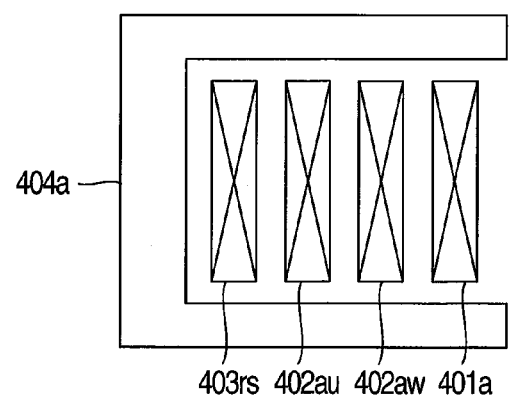
FIG. 5 is a schematic view showing a structure of a part 1 of an example of a transformer winding disposition.
Figure 6:
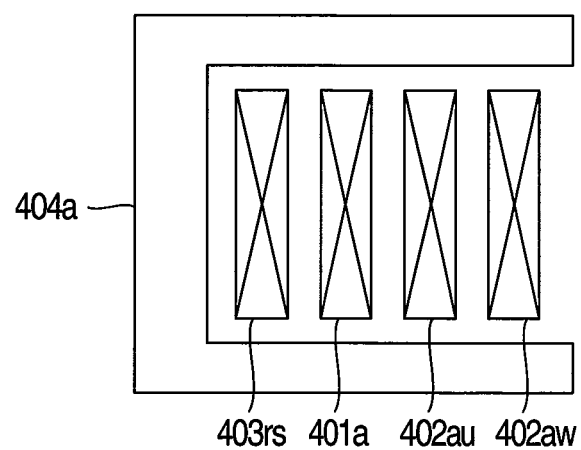
FIG. 6 is a schematic view showing a structure of a part 2 of an example of a transformer winding disposition.

FIGS. 5 and 6 are respectively schematic cross-sectional views each showing one of an example of a disposition of the iron core legs and the windings for one phase of the transformer 104. FIG. 5 is different in the disposition of the windings from FIG. 6. As will be described later, although the inventors of the present invention found out that although with the disposition of the windings shown in FIG. 5, the DC fault current described above is caused to flow as the zero-phase DC current into the AC grid, with the disposition of the windings shown in FIG. 6, the above DC current caused to flow as the zero-phase DC current into the AC grid can be reduced.

In FIG. 5, the windings are disposed in order of the rs-phase tertiary winding 403rs, the a-leg u-phase secondary winding 402au, the a-leg w-phase secondary part-winding 402aw, and the a-phase primary winding 401a from the side close to the a-phase iron core leg 404a.

On the other hand, in FIG. 6, the windings are disposed in order of the rs-phase tertiary winding 403rs, the a-phase primary winding 401a, the a-leg a-phase secondary part-winding 402au, and the a-leg w-phase primary winding 402a from the side close to the a-phase iron core leg 404a.

Hereinafter, the principles in which the magnitude of the inflow of the DC fault current as the zero-phase DC current into the AC grid differs depending on dispositions of the windings of FIGS. 5 and 6 will be described with reference to FIG. 7.

Figure 7:
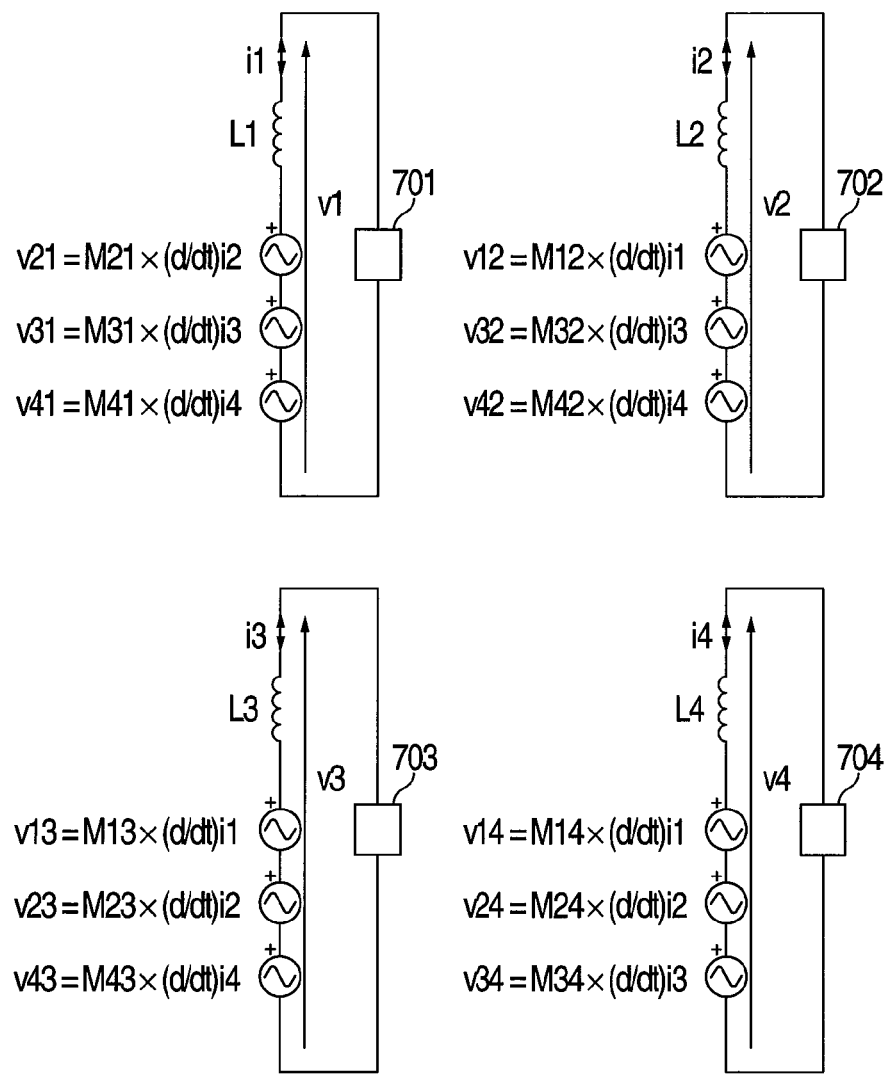
FIG. 7 is a circuit diagram of an equivalent circuit for one phase of the windings of the transformer.

FIG. 7 is an equivalent circuit using the self/mutual inductances of the windings for one phase of the transformer 104.

It is noted that let L1 be the self-inductance of the a-phase primary winding 401a, let L2 be the self-inductance of the a-leg a-phase secondary part-winding 402au, let L3 be the self-inductance of the a-leg w-phase secondary part-winding 402aw, and let L4 be the self-inductance of the rs-phase tertiary winding 403rs.

In addition, let M12 (=M21) be the mutual inductance between the a-phase primary winding 401a and the a-leg a-phase secondary part-winding 402au, let M13 (=M31) be the mutual inductance between the a-phase primary winding 401a and the a-leg w-phase secondary part-winding 402aw, and let M14 (=M41) be the mutual inductance between the a-phase primary winding 401 and the rs-phase tertiary winding 403rs. Also, let M23 (=M32) be the mutual inductance between the a-leg a-phase secondary part-winding 402au and the a-leg w-phase secondary part-winding 402aw, let M24 (=M42) be the mutual inductance between the a-leg a-phase secondary part-winding 402au and the rs-phase tertiary winding 403rs, and let M34 (=M43) be the mutual inductance between the a-leg w-phase secondary part-winding 402aw and the rs-phase tertiary winding 403rs.

Let i1 be the current caused to flow through the self-inductance L1, let i2 be the current caused to flow through the self-inductance L2, let i3 be the current caused to flow through the self-inductance L3, and let i4 be the current caused to flow through the self-inductance L4.

In addition, let v1 be the voltage which is induced in the a-phase primary winding 401a, and let v2 be the voltage induced in the a-leg a-phase part-winding 402a. Also, let v3 be the voltage which is induced in the a-leg w-phase secondary part-winding 402aw, and let v4 be the voltage induced in the rs-phase tertiary winding 403rs.

Moreover, let v12, v13, and v14 be the voltages which are respectively induced in the self-inductances L2, L3, and L4 by the current i1, and let v21, v23, and v24 be the voltages which are respectively induced in the self-inductances L1, L3, and L4 by the current i2. Also, let v31, v32, and v34 be the voltages which are respectively induced in the self-inductances L1, L2, and L4 by the current i3, and let v41, v42, and v44 be the voltages which are respectively induced in the self-inductances L1, L2, and L3 by the current i4.

It is noted that external circuits 701 to 704 are illustrated by representing external circuits of the a-phase primary winding 401a, the a-leg u-phase secondary part-winding 402au, the a-leg w-phase secondary part-winding 402aw, and the rs-phase tertiary winding 403rs, respectively.

Expression (1) holds in the equivalent circuit of the transformer 104 shown in FIG. 7:

$$\begin{bmatrix} v1 \\ v2 \\ v3 \\ v4 \end{bmatrix} = \begin{bmatrix} L1 & M21 & M31 & M41 \\ M12 & L2 & M32 & M42 \\ M13 & M23 & L3 & M43 \\ M1 & M24 & M34 & L4 \end{bmatrix} \frac{d}{dt} \begin{bmatrix} i1 \\ i2 \\ i3 \\ i4 \end{bmatrix} \quad (1)$$

If the mutual inductances M12 (=M21), M13 (=M31), M14 (=M41), M23 (=M32), M24 (=M42), and M34 (=M43) are expressed by using the coupling coefficients, then, Expression (1) can be expressed by Expressions (2) to (7):

$$M12 = M21 = k12\sqrt{L1L2} \quad (2)$$

$$M13 = M31 = k13\sqrt{L1L3} \quad (3)$$

$$M14 = M41 = k14\sqrt{L1L4} \quad (4)$$

$$M23 = M32 = k23\sqrt{L2L3} \quad (5)$$

$$M24 = M42 = k24\sqrt{L2L4} \quad (6)$$

$$M34 = M43 = k34\sqrt{L3L4} \quad (7)$$

Hereinafter, a description will be given with respect to the currents which are caused to flow through the windings, respectively, when the DC fault 108 has occurred, by using Expressions (1) to (7). However, a description will now be given by paying attention only to the zero-phase components of the voltages and currents on the assumption that the DC currents on the secondary winding side of the transformer 104 contain only the zero-phase components.

When the DC fault has occurred, the DC current IDC is increased, and the DC current (IDC/3) which is caused to flow through the secondary windings 402 ⅓ by ⅓ from the point N of FIG. 4 toward the points u, v, and w is also increased.

As shown in FIG. 4, the direction of the DC current IDC/3 through the a-leg u-phase secondary part-winding 402au is opposite to the direction of the DC current IDC/3 which is caused to flow through the a-leg w-phase secondary part-winding 402aw.

Therefore, in the equivalent circuit of FIG. 7, a relationship of i2=−i3=−IDC/3 holds.

Here, a description will now be given with respect to the zero-phase voltages which are respectively applied to the primary windings 401 and the tertiary windings 403 when the DC fault 108 has occurred.

If it is supposed that none of the phase-voltages VSa, VSb, and VSc of the AC grid 101 contains therein the zero-phase components, then, the zero-phase voltages which are respectively applied to the primary windings 401 are each approximately 0V. Therefore, in FIG. 7, the induced voltage v4 is approximately 0V.

In addition, since the tertiary windings 403 are wound in the form of the Δ-connection, the zero-phase voltages which are respectively applied to the tertiary windings 403 are each approximately 0V. Therefore, in FIG. 7, the induced voltage v4 is approximately 0V.

As described above, if the relationship of i2=−i3=−IDC/3 holds, then, the currents i1 and i4 are approximately expressed by Expressions (8) and (9) from FIG. 7 and Expressions (1) to (7):

$$\frac{d}{dt}i1 = -\frac{1}{L1}(v21 + v31) - \frac{M41}{L1}\frac{d}{dt}i4 \quad (8)$$

$$\frac{d}{dt}i4 = -\frac{1}{L4}(v24 + v34) - \frac{M41}{L4}\frac{d}{dt}i1 \quad (9)$$

In addition, (v21+v31) and (v24+v34) in the second terms of Expressions (8) and (9) are respectively expressed by Expressions (10) and (11):

$$v21 + v31 = -(M21 - M31)\frac{d}{dt}iDC \quad (10)$$

$$v24 + v34 = -(M24 - M34)\frac{d}{dt}iDC \quad (11)$$

If Expressions (9), (10), and (11) are all substituted into Expression (8), then, Expression (12) is obtained:

$$\frac{d}{dt}i1 = \frac{L4(M12 - M13) - M14(M24 - M34)}{L1L4 - M14^2}\frac{d}{dt}iDC \quad (12)$$

Here, if Expressions (2) to (4), (6), and (7) are all substituted into the mutual inductances M12, M13, M14, M24, and M34, then, Expression (13) is obtained:

$$\frac{d}{dt}i1 = \frac{L4(A + B)}{L1L4 - k14^2\sqrt{L1L4}}\frac{d}{dt}iDC \quad (13)$$

That is to say, the current i1 is expressed by Expression (14):

$$i1 = \frac{L4(A + B)}{L1L4 - k14^2\sqrt{L1L4}}iDC \quad (14)$$

However, A and B in Expressions (13) and (14) are respectively expressed by Expressions (15) and (16):

$$A = (k12\sqrt{L1L2} - k13\sqrt{L1L3}) \quad (15)$$

$$B = -k14(k24\sqrt{L1L2} - k34\sqrt{L1L3}) \quad (16)$$

Here, there are the case where A and B in Expressions (14) to (16) are strengthened (A>0, B>0 or A<0, B<0) by a combination of the coupling coefficients k12, k13, k14, k24, and k34, and the case where A and B in Expressions (14) to (16) are weakened (A>0, B<0 or A<0, B>0) by a combination of the coupling coefficients k12, k13, k14, k24, and k34.

When k12>k13 and k24>k34, the terms within parentheses of Expressions (15) and (16) both become positive. This results in that A>0 and B<0. Thus, since A and B have opposite signs, (A+B) are weakened. That is to say, the current i1 becomes small.

When k12<k13, and k24<k34, the terms within the parentheses of Expressions (15) and (16) both become negative. This results in that A<0 and B>0. Thus, since A and B have the opposite signs, (A+B) are weakened. That is to say, the current i1 becomes small.

When k12>k13 and k24<k34, the terms within the parenthesis of Expression (15) becomes positive, and the terms within the parenthesis of Expression (16) become negative. This results in that A>0 and B>0. Thus, since A and B have the same signs, (A+B) are strengthened. That is to say, the current i1 becomes large.

When k12<k13, and k24>k34, the terms within the parenthesis of Expression (15) becomes negative, and the terms within the parenthesis of the Expression (16) becomes positive. This results in that A<0 and B<0. Thus, since A and B have the same sign, (A+B) are strengthened. That is to say, the current i1 becomes large.

Summarizing the foregoing, when the magnitude relationship between the coupling coefficients k12 and k13 is equal to the magnitude relationship between the coupling coefficients k24 and k34, the current i1 becomes small.

Contrary to this, when the magnitude relationship between the coupling coefficients k12 and k13 is different from the magnitude relationship between the coupling coefficients k24 and k34, the current i1 becomes large.

Hereinafter, a description will be given with respect to the correspondence between the two winding dispositions shown in FIGS. 5 and 6, and the magnitude relationship among the coupling coefficients described above.

As described above, in FIG. 5, the windings are disposed in order of the rs-phase tertiary winding 404rs, the a-leg u-phase secondary part-winding 402au, the a-leg w-phase secondary part-winding 402aw, and the a-phase primary winding 401a from the side close to the a-phase iron core leg 404a.

In FIG. 5, the a-leg u-phase part-winding 402au is disposed farther away from the a-phase primary winding 401a, and the a-leg w-phase secondary winding 402aw is disposed closer to the a-phase primary winding 401a. Therefore, the coupling coefficient k12 between the a-phase primary winding 401a and the a-leg u-phase part-winding 402au is smaller than the coupling coefficient k13 between the a-phase primary winding 401a and the secondary winding 402aw (k12<k13).

In addition, the a-leg u-phase secondary part-winding 402au is disposed closer to the rs-phase tertiary winding 403rs, and the a-leg w-phase secondary part-winding 402aw is disposed farther away from the rs-phase tertiary winding 403rs. Therefore, the coupling coefficient k24 between the rs-phase tertiary winding 403rs and the a-leg u-phase secondary part-winding 402au is larger than the coupling coefficient k34 between the rs-phase tertiary winding 403rs and the a-leg w-phase secondary part-winding 402aw (k24>k34).

Since from the foregoing, a relationship of k12<k13 and k24>k34 holds in the winding disposition of FIG. 5, each of A and B in Expression (14) becomes negative. Therefore, when the C fault 10 has occurred, the DC current IDC is increased, and along with this, the large zero-phase DC currents are caused to flow into the AC grid 101 through the primary windings 401.

On the other hand, in FIG. 6, the a-leg u-phase secondary part-winding 402au is disposed closer to the a-phase primary winding 401a, and the a-leg w-phase secondary part-winding 402aw is disposed farther away from the a-phase primary winding 401a. Therefore, the coupling coefficient k12 between the a-phase primary winding 401a and the a-leg u-phase secondary part-winding 402au is larger than the coupling coefficient k13 between the a-phase primary winding 401a and the a-leg w-phase secondary part-winding 402aw (k12>k13).

In addition, the a-leg u-phase secondary part-winding 402au is disposed closer to the rs-phase tertiary winding 403rs, and the a-leg w-phase secondary part-winding 402aw is disposed farther away from the rs-phase tertiary winding 403rs. Therefore, the coupling coefficient k24 between the rs-phase tertiary winding 403rs and the a-leg u-phase secondary winding 402au is larger than the coupling coefficient k34 between the rs-phase tertiary winding 403rs and the a-leg w-phase secondary part-winding 402aw (k24>k34).

Since from the foregoing, a relationship of k12>k13 and k24>k34 holds in the winding disposition of FIG. 6. A in Expression (14) becomes negative, and B in Expression (14) becomes positive. Therefore, when the C fault 10 has been generated, the DC current IDC is increased, and along with this, it is possible to reduce that the zero-phase DC currents are caused to flow into the AC grid 101 through the primary windings 401.

It is noted that even when in FIG. 6, the position of the secondary part-winding 402au is replaced with the position of the secondary part-winding 402aw, the same effect can be obtained.

Hereinabove, the description has been given with respect to the principles in which the zero-phase DC currents which are caused to flow into the AC grid 101 in the phase of generation of the DC fault 108 can be reduced by using the winding disposition shown in FIG. 6. Hereinafter, a description will be given with respect to an influence and an effect when the winding structure of FIG. 5 and the winding structure of FIG. 6 by using schematic waveforms shown in FIGS. 8 and 9.

Figure 8:
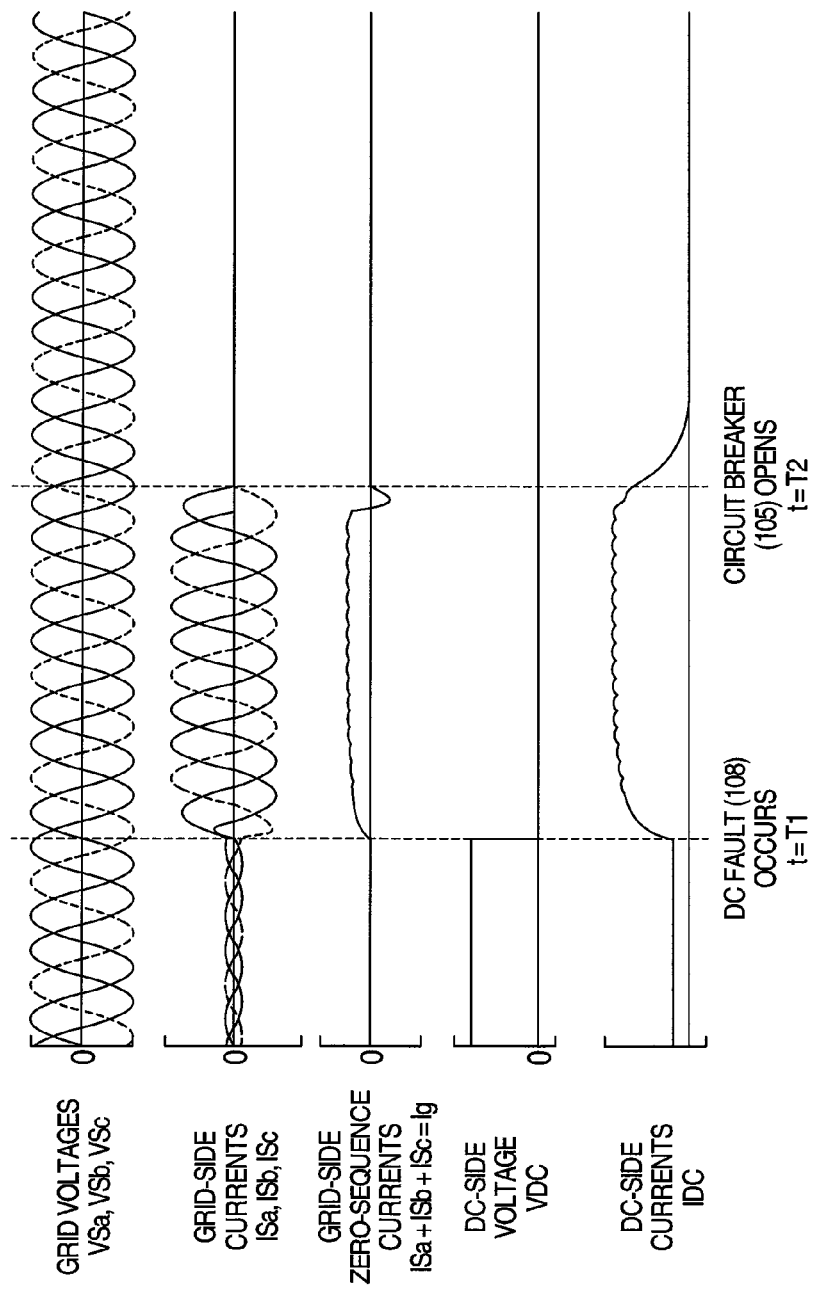
FIG. 8 is a schematic waveform chart when the part 1 of the example of the transformer winding disposition is used.

FIG. 8 is the schematic waveform until in the power conversion apparatus 103 of FIG. 1 when the winding structure shown in FIG. 5 is used, the DC fault 108 has occurred, and thereafter, the fault current is cut off by the breaker 105. However, since the ideal power source is assumed in terms of the AC grid 101, the waveforms are drawn in which even in the phase of generation of the DC fault (time T1<t<T2), none of the phase voltages VSa, VSb, and VSc of the AC grid 101 is changed.

The waveforms shown in FIG. 8 are the schematic waveforms of the phase voltages VSa, VSb, and VSc of th AC grid 101, the currents ISa, ISb, and ISc which are caused to flow through the AC grid 101, the zero-phase currents ISa+ISb+ISc (=Ig) which is caused to flow through the AC grid 101, the DC voltage VDC, and the DC current IDC from the above.

At and before the time t=T1, the power conversion apparatus 102 carries out the rectifier operation for receiving the effective electric power from the AC grid 101, and transmitting the DC electric power to the other-side converter 109 through the DC transmission line (not shown).

When the DC fault occurs at the time t=T1, the DC voltage VDC is reduced to approximately 0V, and the AC fault current is caused to flow from the AC grid 101 into the power conversion apparatus 103. Therefore, the amplitudes of the currents ISa, ISb, and ISc are each increased.

As described above, each of the converter arms 106*u*, 106*v*, and 106*w* is operated as the half-wave rectifier during generation of the DC fault, and thus the amplitude of the DC current IDC is also increased.

Here, since in the transformer 104 using the winding disposition of FIG. 5, as described above, the increase of the DC current IDC induces the large zero-phase DC currents in the primary windings 401*a*, 401*b*, and 401*c*, the zero-phase current (ISa+ISb+ISc) is caused to flow out. The zero-phase current (ISa+ISb+ISc) (=Ig) is caused to flow between the grounding point (point g) of the transformer 104, and the grounding point 102 of the 4 AC grid 101. The flowing of the zero-phase current (ISa+ISb+ISc) (=Ig) results in that the currents ISa, ISb, and ISc which are caused to flow through the AC grid 101 have the waveform on each of which the offset is superimposed, and thus there is the possibility that the currents ISa, ISb, and ISc exert the bad influence on the cutoff performance of the breaker 105.

At the time t=T2, the breaker 105 releases all of the three phases, and each of the currents ISa, ISb, and ISc becomes 0 A. After that, the DC current IDC attenuates.

Figure 9:
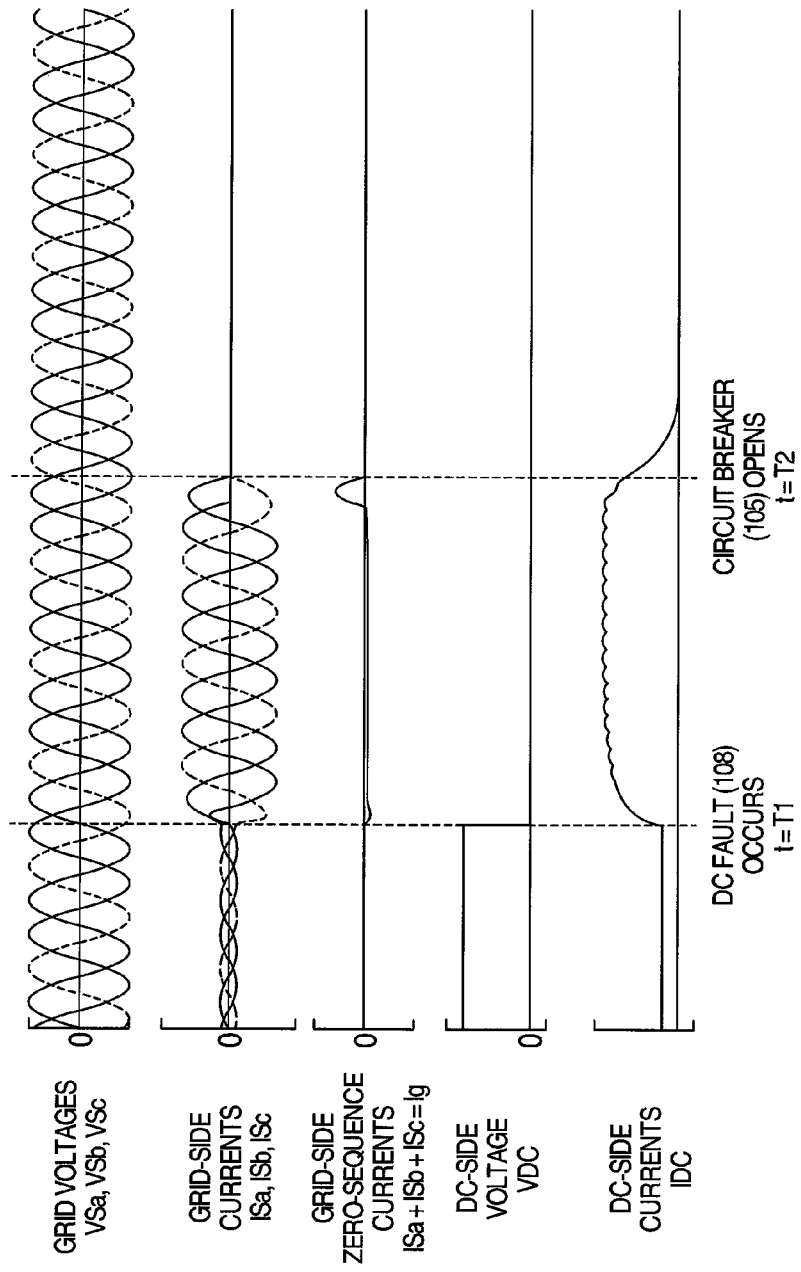
FIG. 9 is a schematic waveform chart when the part 2 of the example of the transformer winding disposition is used.

On the other hand, FIG. 9 is the schematic waveform until in the power conversion apparatus 103 of FIG. 1 when the winding structure shown in FIG. 6 is used, the DC fault 108 has occurred, and thereafter, the fault current is cut off by the breaker 105. Similarly to the case of the waveforms shown in FIG. 8, since the ideal power source is assumed in terms of the AC grid 101, even in the phase of generation of the DC fault (time T1<t<T2), the phase voltages VSa, VSb, and VSc of the AC grid 101 draws the waveforms none of which is changed.

The waveforms shown in FIG. 9 are, similarly to the case off the waveforms shown in FIG. 8, the schematic waveforms of the phase voltages VSa, VSb, and VSc of th AC grid 101, the currents ISa, ISb, and ISc which are caused to flow through the AC grid 101, the zero-phase current (ISa+ISb+ISc) (=Ig) which is caused to flow through the AC grid 101, the DC voltage VDC, and the DC current IDC from the above.

At and before the time t=T1, the power conversion apparatus 102 carries out the rectifier operation for receiving the effective electric power from the AC grid 101, and transmitting the DC electric power to the other-side converter 109 through the DC transmission line (not shown).

When the DC fault occurs at the time t=T1, the DC voltage VDC is reduced to approximately 0V, and the AC fault current is caused to flow from the AC grid 101 into the power conversion apparatus 103. Therefore, the amplitudes of the currents ISa, ISb, and ISc are each increased.

As described above, each of the converter arms 106*u*, 106*v*, and 106*w* is operated as the half-wave rectifier during generation of the DC fault, and thus the amplitude of the DC current IDC is also increased.

Here, since in the transformer 104 using the winding disposition of FIG. 6, it is possible to obtain the effect that as described above, the increase of the DC current IDC makes it possible to reduce the zero-phase DC currents which are induced in the primary windings 401*a*, 401*b*, and 401*c*, respectively. Therefore, since the offsets which are superimposed on the currents ISa, ISb, and ISc, respectively, can also be reduced, it is possible to obtain an effect that the cutoff performance of the breaker 105 can be made approximately equal to that in the case of only the AC current.

At the time t=T2, the breaker 105 releases all of the three phases, and each of the currents ISa, ISb, and ISc becomes 0 A. After that, the DC current IDC attenuates.

Hereinabove, there has been described the effect that the zero-phase DC current in the phase of generation of the DC fault can be reduced by the winding disposition of FIG. 6 by using the schematic waveforms shown in FIGS. 8 and 9.

Note that, in the first embodiment of the present invention, the description has been mainly given with respect to the case where the bidirectional chopper cell type unit converter 107*c* is used as the unit converter 107. However, even when the full-bridge circuit type unit converter 104*f* shown in FIG. 4 is used, the same effect can be obtained in those cases where the DC current IDC is increased.

In addition, the present invention can be applied to the case as well of a unit converter a system of which is different from that of either the bidirectional chopper cell type unit converter 107*c* shown in FIG. 2, or the full-bridge circuit type unit converter 104*f* shown in FIG. 4.

Moreover, if the magnitude relationship among the coupling coefficients meets the conditions described above, then, even when a transformer having a winding disposition other than the winding disposition shown in FIG. 6 is used, it is possible to obtain the same effect as that in the case of the winding disposition shown in FIG. 6.

In the first embodiment of the present invention, the DC negative side terminal (point N) can be grounded. In this case, it is possible to obtain an effect that the ground DC electric potentials of the secondary windings of the transformer can be made approximately 0V.

Second Embodiment

Hereinafter, a power conversion apparatus according to a second embodiment of the present invention will be described.

The power conversion apparatus of the second embodiment is a power conversion apparatus as will be described below. That is to say, a bidirectional chopper circuit is used as a unit converter. Also, three circuits in each of which three conversion arms configured by connecting plural bidirectional chopper circuits in series with one another, and three secondary windings of a transformer are connected in series with each other are connected in parallel with each other. One end of a parallel connection point is used as a DC positive side terminal, and the other end thereof is used as a DC negative side terminal. Also, primary windings of the transformer are connected to a three-phase power grid, and tertiary windings of the transformer are wound in the form of Δ-connection.

In addition, the power conversion apparatus of the second embodiment has a configuration of the HVDC in which the DC terminals of the two power conversion apparatuses, or DC terminals of the one power conversion apparatus and a power conversion apparatus using another system, for example, are connected to each other through a DC transmission line, of the frequency conversion apparatus (FC), or of the Back-to-Back (BTB) system.

The power conversion apparatus of the second embodiment is different from the power conversion apparatus of the first embodiment in that the positions where the converter arms, and the secondary windings of the transformer are connected in series with one another are changed.

According to the power conversion apparatus of the second embodiment, similarly to the case of the power conversion apparatus of the first embodiment, it is possible to obtain the effect that in the phase of generation of the grounding/short-circuiting fault in the DC transmission line, the DC fault current can be prevented from being caused to flow as the zero-phase DC current into the AC grid side.

In addition, in the power conversion apparatus of the second embodiment, it is possible to obtain an effect that when the neutral point between the DC positive side terminal and the DC negative side terminal of the power conversion apparatus is grounded, the ground DC electric potentials of the secondary windings of the transformer can be made approximately 0V.

Figure 10:
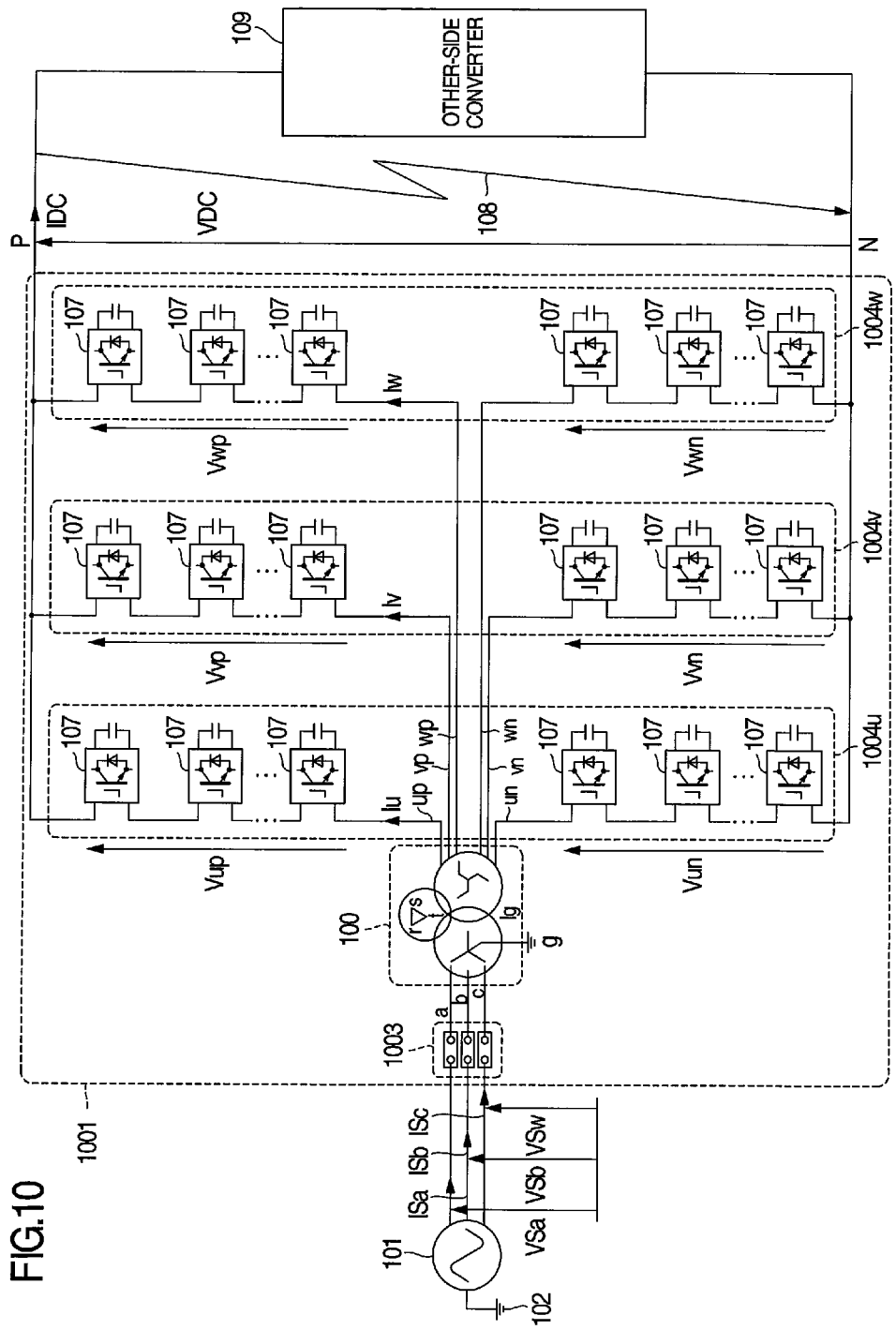
FIG. 10 is a circuit diagram showing a configuration of a power conversion apparatus according to a second embodiment of the present invention.

Firstly, an entire configuration of the power conversion apparatus of the second embodiment will be described with reference to FIG. 10.

A power conversion apparatus 1001 is connected to the AC grid 101 through both of a transformer 1002 and a breaker 1003. The AC grid 101 is grounded at the grounding point 102. In addition, the AC grid 101 is connected to the points a, b, and c of the primary windings of the transformer 1002, and converter arms 1004u, 1004v, and 1004w are connected between points up, vp, and wp, and points un, vn, and wn of the secondary windings of the transformer 1002, respectively. Also, the tertiary windings of the transformer 104 are wound in the form of the Δ-connection. It is noted that a detailed configuration of the transformer 1002 will be described later with reference to FIG. 11. In addition, ends of the transformer arms 1004u, 1004v, and 1004w opposite to the points up, vp, and wp are all connected to the DC positive side terminal (point P). Moreover, ends of the transformer arms 1004u, 1004v, and 1004w opposite to the points un, vn, and wn are all connected to the DC negative side terminal (point N).

Figure 11:
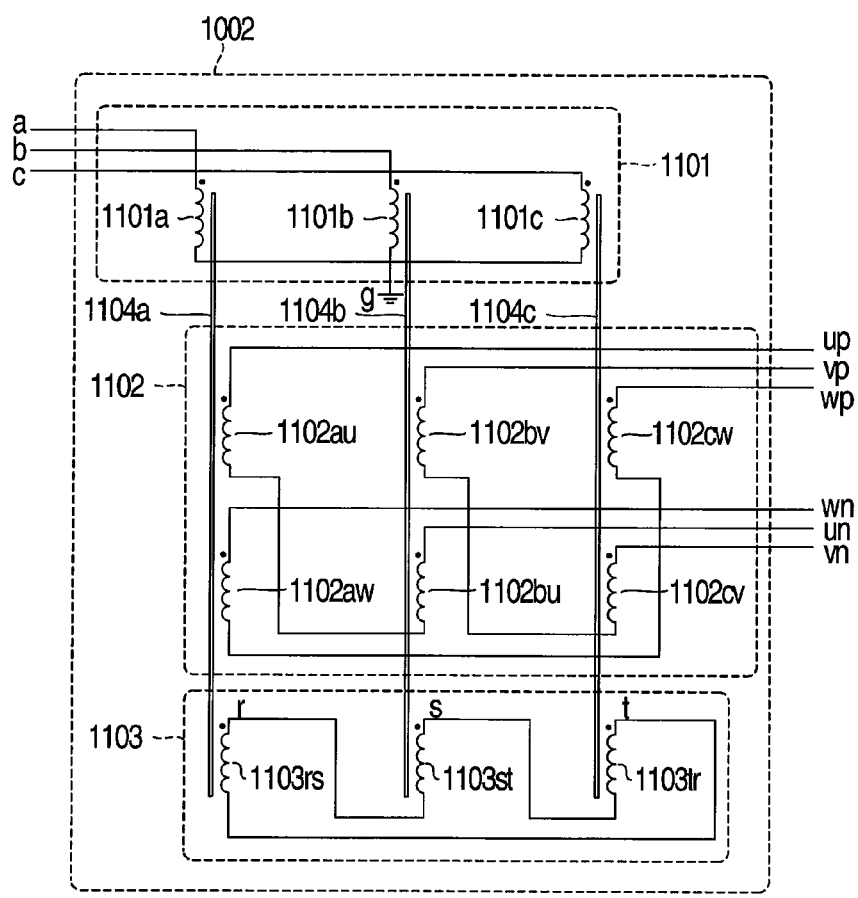
FIG. 11 is a circuit diagram showing a configuration of windings of a transformer in the second embodiment.

That is to say, the power conversion apparatus 1001 of the second embodiment adopts such a configuration that circuits in which the secondary windings in FIG. 11 of the transformer 1002, and the transformer arms 1004u, 1004v, and 1004w are connected in series with each other are connected in parallel between the point P and the point N.

An other-side converter 109 is connected either directly between the DC positive side terminal (point P) and the DC negative side terminal (point N) or indirectly between the DC positive side terminal (point P) and the DC negative side terminal (point N) through a DC transmission line (not shown). Here, the other-side converter 109 can have either the same configuration as that of the power conversion apparatus 1001 or a configuration different from that of the power conversion apparatus 1001.

Each of the converter arms 1004u, 1004v, and 1004w is a series circuit of plural unit converters 107. An internal configuration of the unit converter 107 is as shown in FIGS. 2 and 3.

Hereinafter, an example of a connection state of the windings of the transformer 1002 will be described with reference to FIG. 11.

An a-phase primary winding 1101a, an a-leg u-phase secondary winding 1102au, an a-leg w-phase secondary winding 1102aw, and an rs-phase tertiary winding 1103rs are wound around an a-phase iron core leg 1104a. In addition, a b-phase primary winding 1101b, a b-leg v-phase secondary winding 1102bv, a b-leg u-phase secondary winding 1102bu, and an st-phase tertiary winding 1103st are wound around a b-phase iron core leg 1104b. Likewise, a c-phase primary winding 1101c, a c-leg w-phase secondary winding 1102 cw, a c-leg v-phase secondary winding 1102cv, and an st-phase tertiary winding 1103ts are wound around a c-phase iron core leg 1104c.

That is to say, the transformer 1002 includes the four tertiary windings: the primary winding; the two secondary part-windings; and the tertiary winding.

In addition, when the iron core legs 1104a, 1104b, and 1104c of the transformer 1002 compose independent magnetic paths, respectively, and thus are composed in the form of three single-phase transformers, in other words, it can be said that the power conversion apparatus 1001 includes three single-phase transformers having four single-phase windings.

The primary windings 1101a, 1101b, and 1101c are wound in the form of the star-connection, and are grounded at the point g.

In addition, one ends of secondary part-windings 1102aw, 1102bu, and 1102cv are connected to the transformer arms 1104u, 1104v, and 1104w through the points wn, un, and vu, respectively.

Moreover, one ends of secondary part-windings 1102au, 1102bv, and 1102cw are connected to the transformer arms 1104u, 1104v, and 1104w through points up, vp, and wp, respectively.

Ends of the secondary part-windings 1102au, 1102bv, and 1102cw opposite to the transformer arms 1104u, 1104v, and 1104w are connected to ends of the secondary part-windings 1102aw, 1102bu, and 1102cv opposite to the transformer arms 1104u, 1104v, and 1104w, respectively.

In other words, the six secondary part-windings 1102au, 1102bv, 1102cw, 1102aw, 1102bu, and 1102cv compose open zigzag connection. In the second embodiment of the present invention, the six secondary part-windings 1102au, 1102bv, 1102cw, 1102aw, 1102bu, and 1102cv are generically, simply referred to as the secondary windings. Here, the winding numbers of six secondary part-windings 1102au, 1102bv, and 1102cw, and 1102aw, 1102bu, and 1102cv are approximately equal to one another.

Note that, in FIG. 11, the case where the secondary part-windings 1102au and 1102bu, for example, are connected to each other is drawn as the connection among the six secondary part-windings 1102au, 1102bv, and 1102cw, and 1102aw, 1102bu, and 1202cv. However, the present invention can be applied to the case as well where the secondary windings 1102 are wound in the form of the zigzag connection using a combination of the secondary part-windings different from that shown in FIG. 11, and thus the second embodiment of the present invention shall contain therein such a case.

The windings 1103rs, 1103st, and 1103tr of the tertiary windings 403 are wound in the form of the Δ-connection. Although in FIG. 11, none is connected to the points r, s, and t, the second embodiment shall contain therein the case where the loads or the power sources of the auxiliary apparatus or the like are connected to the points r, s, and t, respectively. When the loads are connected to the points r, s, and t, respectively, it is possible to obtain an effect that the electric powers can be supplied from the tertiary windings 403 to these loads, respectively. In addition, when the power sources are connected to the points r, s, and t, respectively, it is possible to obtain an effect that the capacitors 203 (and the capacitors 301 in FIG. 3) included in the unit converters 107 of the converter arms 1104u, 1104v, and 1104w, respectively, can be charged with the electricity from the tertiary windings 403.

Even if the three iron core legs 1104a, 1104b, and 1104c compose a three-leg iron core or even if the three iron core legs 1104a, 1104b, and 1104c compose, together with other two legs (not shown), a five-leg iron core, the present invention can be applied to such a case. In addition, the present invention can be applied to the case as well where the three iron core legs 1104a, 1104b, and 1104c compose the independent magnetic paths, respectively, and the transformer 1002 is composed in the form of three single-phase transformers.

Here, in this specification, of the windings of the transformer 1002, the windings connected to the AC grid 101 are referred to as the primary windings, the windings connected to the converter arms 1104u, 1104v, and 1104w are referred to as the secondary windings, and the windings which are wound in the form of the Δ-connection are referred to as the tertiary windings. However, the terms of "primary", "secondary", and "tertiary" are convenient names for a description, and thus even when the names are different from those, present invention can be applied thereto.

In the second embodiment, in FIGS. 5 and 6 used in the description of the first embodiment of the present invention, the winding disposition for which the reference symbols are replaced as follows shall be used. That is to say, reference symbols 401a, 402a, 402aw, and 403rs shall be replaced with 1101a, 1101au, 1102aw, and 1103rs, respectively.

When the winding disposition of FIG. 6 in which reference symbols are replaced in the manner as described above is used, similarly to the case of the first embodiment of the present invention, it is possible to obtain an effect that the zero-phase DC currents which are induced in the primary windings 1101a to be caused to flow into the AC grid 101 when the DC fault 108 has occurred can be reduced.

Note that, in the first embodiment of the present invention, the description has been mainly given with respect to the case where the bidirectional chopper cell type unit converter 107c is used as the unit converter 107. However, even when the full-bridge circuit type unit converter 104f shown in FIG. 4 is used, the same effect can be obtained in those cases where the DC current IDC is increased.

In addition, the present invention can be applied to the case as well of a unit converter a system of which is different from that of either the bidirectional chopper cell type unit converter 107c shown in FIG. 2, or the full-bridge circuit type unit converter 104f shown in FIG. 4.

Moreover, if the magnitude relationship among the coupling coefficients meets the conditions described above, then, even when a transformer having a winding disposition other than the winding disposition shown in FIG. 6 is used, it is possible to obtain the same effect as that in the case of the winding disposition in the first embodiment shown in FIG. 6.

Here, it is also possible to obtain an effect that as shown in FIG. 6 of the second embodiment of the present invention, the secondary windings 402 wound in the form of the zigzag connection are disposed in the positions away from the iron core legs 404a, 404b, and 404c, respectively, whereby the insulating property for a surge voltage which is generated across the two secondary part-windings by, for example, the lightning strike can be readily secured.

Third Embodiment

Hereinafter, a power conversion apparatus according to a third embodiment of the present invention will be described.

The power conversion apparatus of the third embodiment is a power conversion apparatus as will be described below. That is to say, a bidirectional chopper circuit is used as a unit converter. Also, three circuits in each of which three conversion arms configured by connecting plural bidirectional chopper circuits in series with one another, and three secondary windings of a transformer are connected in series with each other are connected in parallel with each other. One end of a parallel connection point is used as a DC positive side terminal, and the other end thereof is used as a DC negative side terminal. Also, primary windings of the transformer are connected to a three-phase power grid, and tertiary windings of the transformer are wound in the form of Δ-connection.

In addition, the power conversion apparatus of the third embodiment has a configuration of the HVDC in which the DC terminals of the two power conversion apparatuses, or DC terminals of the one power conversion apparatus and a power conversion apparatus using another system, for example, are connected to each other through the DC transmission line, of the frequency conversion apparatus (FC), or of the Back-to-Back (BTB) system.

The power conversion apparatus of the third embodiment is different from the power conversion apparatus of the second embodiment in that the connection state of the secondary windings of the transformer 1202 is changed from the connection state of the secondary windings of the transformer 1002.

According to the power conversion apparatus of the third embodiment, similarly to the cases of the power conversion apparatuses of the first and second embodiments, it is possible to obtain the effect that in the phase of generation of the grounding/short-circuiting fault in the DC transmission line, the DC fault current can be prevented from being caused to flow as the zero-phase DC current into the AC grid side.

In addition, in the power conversion apparatus of the third embodiment, similarly to the case of the second embodiment, it is possible to obtain an effect that when the neutral point between the DC positive side terminal and the DC negative side terminal of the power conversion apparatus is grounded, the ground DC electric potentials of the secondary windings of the transformer can be made approximately 0V.

Figure 12:
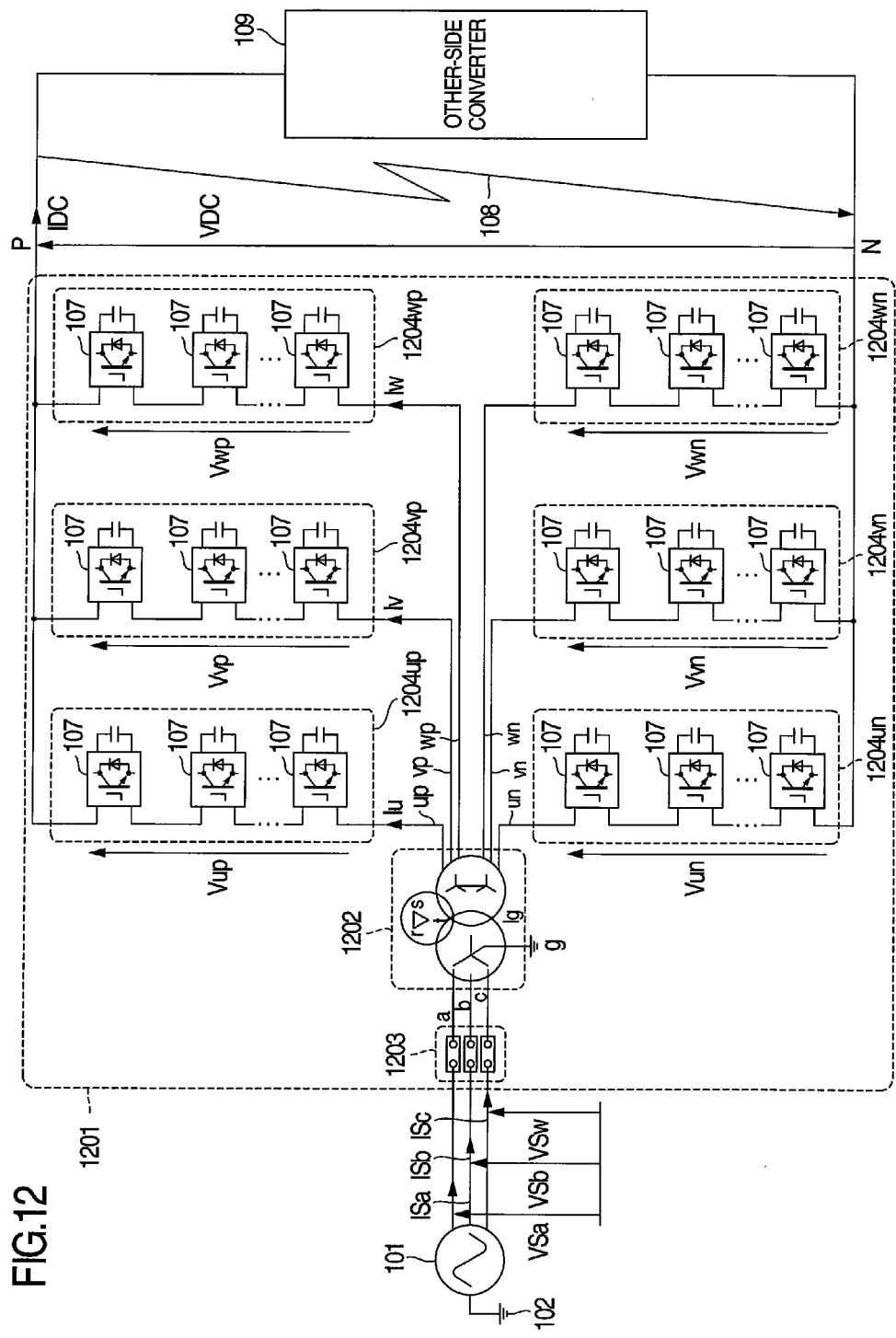
FIG. 12 is a circuit diagram showing a configuration of a power conversion apparatus according to a third embodiment of the present invention.

Firstly, an entire configuration of the power conversion apparatus of the third embodiment will be described with reference to FIG. 12.

A power conversion apparatus 1201 is connected to the AC grid 101 through both of the transformer 1202 and a breaker 1203. The AC grid 101 is grounded at the grounding point 102. In addition, the AC grid 101 is connected to the points a, b, and c of the primary windings of the transformer 1202, and positive side converter arms 1204up, 1204vn and 1204wn are connected to points up, vp, and wp of the secondary windings, respectively. Also, negative side converter arms 1204un, 1204vn, and 124wn are connected to points un, vn, and wn of the secondary windings, respectively, and the tertiary windings are wound in the form of the Δ-connection. It is noted that a detailed configuration of the transformer 1202 will be described later with reference to FIG. 12. In addition, ends of the positive side transformer arms 1204up, 1204vp, and 1204wp opposite to the points up, vp, and wp are all connected to the DC positive side terminal (point P). Moreover, ends of the negative transformer arms 1204un, 1204vn, and 1204wn opposite to the points un, vn, and wn are all connected to the DC negative side terminal (point N).

Figure 13:
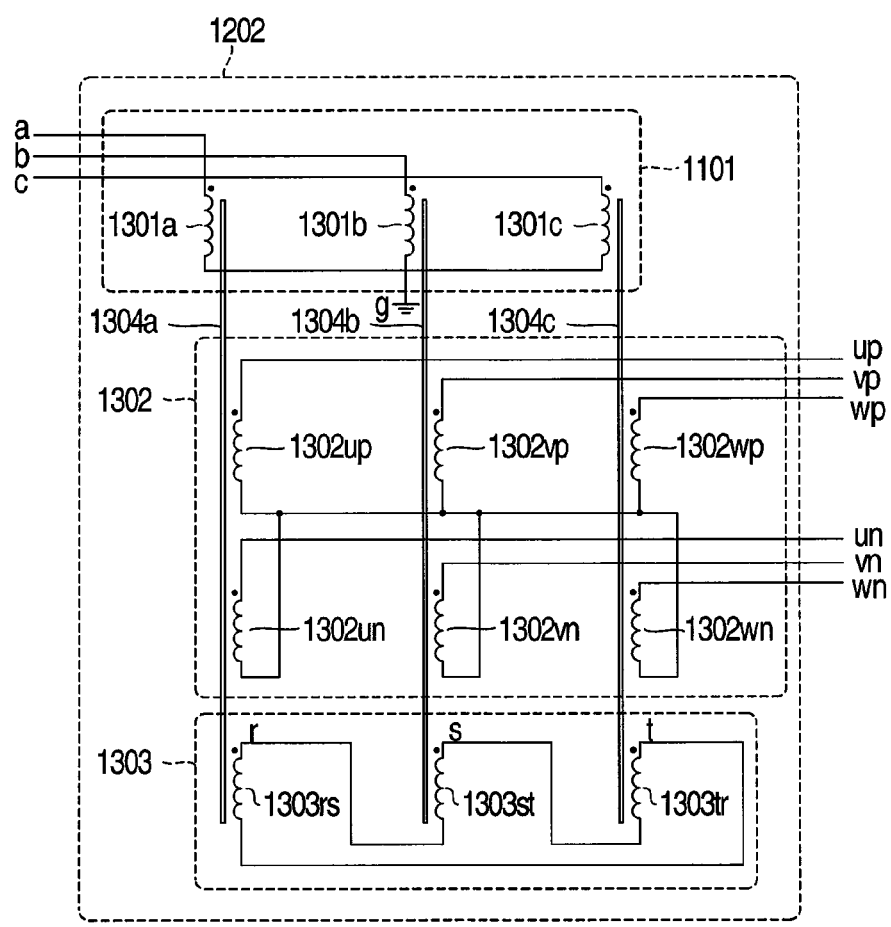
FIG. 13 is a circuit diagram showing a configuration of windings of a transformer in the third embodiment.

That is to say, the power conversion apparatus 1291 of the third embodiment adopts such a configuration that circuits in which the secondary windings 1302up, 1302vp, and 1302wp, and 1302un, 1302vn, and 1302wn in FIG. 13 of the transformer 1202, and the transformer arms 1204up, 1204vp, and 1204wp, and 1204un, 1204vn, and 1204wn are connected in series with each other are connected in parallel between the point P and the point N.

An other-side converter 109 is connected either directly between the DC positive side terminal (point P) and the DC negative side terminal (point N) or indirectly between the DC positive side terminal (point P) and the DC negative side terminal (point N) through a DC transmission line (not shown). Here, the other-side converter 109 can have either the same configuration as that of the power conversion apparatus 1001 or a configuration different from that of the power conversion apparatus 1201.

Each of the converter arms 1204up, 1204vp, and 1204wp, and 1204un, 1204vn, and 1204wn is a series circuit of plural unit converters 107. An internal configuration of the unit converter 107 is as shown in FIGS. 2 and 3.

Hereinafter, an example of a connection state of the windings of the transformer 1202 will be described with reference to FIG. 13.

An a-phase primary winding 1301a, a u-phase secondary winding 1302up, a u-phase negative secondary winding 1302un, and an rs-phase tertiary winding 1303rs are wound around an a-phase iron core leg 1304a. In addition, a b-phase primary winding 1301b, a v-phase positive side secondary winding 1302vp, a v-phase negative side secondary winding 1302vn, and an st-phase tertiary winding 1303st are wound around a b-phase iron core leg 1304b. Likewise, a c-phase primary winding 1301c, a w-phase positive side secondary winding 1302wp, a w-phase negative side secondary winding 1302wn, and an st-phase tertiary winding 1303ts are wound around a c-phase iron core leg 1304c.

That is to say, the transformer 1202 includes the four tertiary windings: the primary winding; the positive side secondary winding; the negative side secondary winding; and the tertiary winding.

In addition, when the iron core legs 1304a, 1304b, and 1304c of the transformer 1202 compose independent magnetic paths, respectively, and thus are composed in the form of three single-phase transformers, in other words, it can be said that the power conversion apparatus 1201 includes three single-phase transformers having four single-phase windings.

The primary windings 1301a, 1301b, and 1301c are wound in the form of the star-connection, and are grounded at the point g.

In addition, one ends of secondary part-windings 1302un, 1302vn, and 1302wn are connected to negative side transformer arms 1204un, 1204vn, and 1204wn through the points wn, un, and vu, respectively.

Moreover, one ends of secondary part-windings 1302up, 1302bp, and 1302wp are connected to transformer arms 1204u, 1204v, and 1204w through points up, vp, and wp, respectively.

Ends of the secondary part-windings 1302up, 1302vp, and 1302wp opposite to the positive side transformer arms 1204up, 1204vp, and 1204wp are connected to ends of the secondary part-windings 1302un, 1302vn, and 1302wn opposite to the negative side transformer arms 1204un, 1204vn, and 1204wn, respectively.

In other words, the six secondary part-windings 1302up, 1302vp, and 1302wp, and 1302un, 1302vn, and 1302wn compose double star connection. In the third embodiment of the present invention, the six secondary part-windings 1302up, 1302vp, and 1302wp, and 1302un, 1302vn, and 1302wn are generically, simply referred to as the secondary windings. Here, the winding numbers of six secondary part-windings 1302up, 1302vp, and 1302wp, and 1302un, 1302vn, and 1302wn are approximately equal to one another.

Note that, in FIG. 13, the case where the secondary part-windings 402au and 402bu, for example, are connected to each other is drawn as the connection among the six secondary part-windings 402au, 402bv, and 402cw, and 402aw, 402bu, and 402cv. However, the present invention can be applied to the case as well where the secondary windings 1302 are wound in the form of the double star connection using a combination of the secondary part-windings different from that shown in FIG. 11, and thus the third embodiment of the present invention shall contain therein such a case.

The windings 1303rs, 1303st, and 1303tr of the tertiary windings 1303 are wound in the form of the Δ-connection. Although in FIG. 13, none is connected to the points r, s, and t, the third embodiment of the present invention shall contain therein the case where the loads or the power sources of the auxiliary apparatus or the like are connected to the points r, s, and t, respectively. When the loads are connected to the points r, s, and t, respectively, it is possible to obtain an effect that the electric powers can be supplied from the tertiary windings 403 to these loads, respectively. In addition, when the power sources are connected to the points r, s, and t, respectively, it is possible to obtain an effect that the capacitors 203 (and the capacitors 301 in FIG. 3) included in the unit converters 107 of the converter arms 1204up, 1204vp, and 1204wp, and 1204un, 1204vn, and 1204wn, respectively, can be charged with the electricity from the tertiary windings 403.

Even if the three iron core legs 1304a, 1304b, and 1304c compose a three-leg iron core or even if the three iron core legs 1304a, 1304b, and 1304c compose, together with other two legs (not shown), a five-leg iron core, the present invention can be applied thereto. In addition, the present invention can be applied to the case as well where the three iron core legs 1304a, 1304b, and 1304c compose the independent magnetic paths, respectively, and the transformer 1202 is composed in the form of three single-phase transformers.

Here, in this specification, of the windings of the transformer 1203, the windings connected to the AC grid 101 are referred to as the primary windings, the windings connected to the converter arms 1004u, 1004v, and 1004w are referred to as the secondary windings, and the windings which are wound in the form of the Δ-connection are referred to as the tertiary windings. However, the terms of "primary", "secondary", and "tertiary" are convenient names for a description, and thus even when the names are different from those, present invention can be applied thereto.

In the third embodiment of the present invention, in FIGS. 5 and 6 used in the description of the first embodiment, the winding disposition for which the reference symbols are replaced as follows shall be used. That is to say, reference symbols 401a, 402au, 402aw, and 403rs shall be replaced with 1301a, 1302au, 1302aw, and 1303rs, respectively.

When the winding disposition of FIG. 6 in which reference symbols are replaced in the manner as described above is used, similarly to the cases of the first and second embodiments, it is possible to obtain the effect that the zero-phase DC currents which are induced in the primary windings 1301a to be caused to flow into the AC grid 101 when the DC fault 108 has occurred can be reduced.

Note that, in the third embodiment of the present invention, the description has been mainly given with respect to the case where the bidirectional chopper cell type unit converter 107c is used as the unit converter 107. However, even when the full-bridge circuit type unit converter 104f shown in FIG. 4 is used, the same effect can be obtained in those cases where the DC current IDC is increased.

In addition, the present invention can be applied to the case as well of a unit converter a system of which is different from that of either the bidirectional chopper cell type unit converter 107c shown in FIG. 2, or the full-bridge circuit type unit converter 104f shown in FIG. 4.

Moreover, if the magnitude relationship among the coupling coefficients meets the conditions described above, then, even when a transformer having a winding disposition other than the winding disposition shown in FIG. 6 is used, it is possible to obtain the same effect as that in the case of the winding disposition in the first embodiment shown in FIG. 6.

The power conversion apparatus, wherein the transformation device having at least three sets of four windings is replaced by three single-phase transformers each having at least four single-phase windings, is also an embodiment of the present invention which provides the same advantageous effect as that in the other embodiments of the invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A power conversion apparatus, comprising:
a transformation device having at least three sets of four windings; and
three converter arms each configured by connecting one or plural unit converters each including a switching device and an energy storage element in series with one another,
wherein said four windings are configured as a first winding, a second winding, a third winding, and a fourth winding, a circuit is configured in each of said three converter arms in such a way that either a power source or a load is connected to said first winding, and said second winding of any one of the three sets, and said third winding of any one of the three sets are connected in series with each other so that an electric power is converted between said circuit and either said power source or said load, and a magnitude relationship between a coupling efficient of said first winding and said second winding, and a coupling efficient of said first winding and said third winding is equal to a magnitude relationship between a coupling efficient of said fourth winding and said second winding, and a coupling efficient (k34) of said fourth winding and said third winding.

2. A power conversion apparatus, comprising:
three single-phase transformers each having at least four single-phase windings; and
three converter arms each configured by connecting one or plural unit converters each including a switching device and an energy storage element in series with one another,
wherein a circuit is configured in each of said three converter arms in such a way that either a power source or a load is connected to a first single-phase winding of each of said three single-phase transformers, a second single-phase winding of any one of said three single-phase transformers, and a third single-phase winding of any one of said three single-phase transformers are connected in series with each other so that an electric power is converted between said circuit and either said power source or said load, and a magnitude relationship between a coupling efficient of said first single-phase winding and said second single-phase winding, and a coupling efficient of said first single-phase winding and said third single-phase winding is equal to a magnitude relationship between a coupling efficient of said fourth single-phase winding and said second single-phase winding, and a coupling efficient of said fourth single-phase winding and said third single-phase winding.

3. The power conversion apparatus according to claim 1, wherein said load is connected to said fourth winding.

4. The power conversion apparatus according to claim 2, wherein said load is connected to said fourth single-phase winding.

5. The power conversion apparatus according to claim 1, wherein said four windings are wound around a three-leg iron core.

6. The power conversion apparatus according to claim 1, wherein said four windings are wound around a four-leg iron core.

7. The power conversion apparatus according to claim 1, wherein said four windings are wound around a five-leg iron core.

8. The power conversion apparatus according to claim 1, wherein said unit converter is configured by using a bidirectional chopper circuit.

9. The power conversion apparatus according to claim 1, wherein said unit converter is configured by a full-bridge circuit.

10. The power conversion apparatus according to claim 1, wherein said second and third windings compose zigzag connection.

11. The power conversion apparatus according to claim 1, wherein said second and third windings compose open zigzag connection.

12. The power conversion apparatus according to claim 1, wherein said second and third windings compose double star connection.

13. The power conversion apparatus according to claim 2, wherein said second and third single-phase windings of said three single-phase transformers compose zigzag connection.

14. The power conversion apparatus according to claim 2, wherein said second and third single-phase windings of said three single-phase transformers compose open zigzag connection.

15. The power conversion apparatus according to claim 2, wherein said second and third single-phase windings of said three single-phase transformers compose double star connection.

16. The power conversion apparatus according to claim 1, wherein the windings are wound in order of one phase of said fourth winding, one phase of said first winding, one phase of said second winding, and one phase of said third winding from a side close to an iron core leg from a side close to an iron core leg.

17. The power conversion apparatus according to claim 1, wherein the windings are wound in order of one phase of said fourth winding, one phase of said first winding, one phase of said third winding, and one phase of said second winding from a side close to an iron core leg.

18. The power conversion apparatus according to claim 2, wherein the windings are wound in order of said fourth single-phase winding, said first single-phase winding, said second single-phase winding, and said third single-phase winding from a side close to an iron core leg.

19. The power conversion apparatus according to claim 2, wherein the windings are wound in order of said fourth single-phase winding, said first single-phase winding, said third single-phase winding, and said second single-phase winding from a side close to an iron core leg.

20. The power conversion apparatus according to claim 1, wherein said first to fourth windings or a set of single-phase windings have at least one Δ-connection.

* * * * *